United States Patent [19]

Feldmann

[11] Patent Number: 5,048,615
[45] Date of Patent: Sep. 17, 1991

[54] WEED AND GRASS TRIMMER

[76] Inventor: Marvin H. Feldmann, 522 W. Riverbend Dr., Plymouth, Wis. 53073

[21] Appl. No.: 476,530

[22] Filed: Feb. 7, 1990

[51] Int. Cl.[5] ............................................. A01D 34/00
[52] U.S. Cl. ........................................ 172/1; 172/356; 172/43; 56/16.7; 56/17.2
[58] Field of Search ..................... 56/12.8, 16.7, 16.9, 56/17.1, 17.2, 289, 295; 172/13, 17, 42, 43, 356, 358

[56] References Cited

U.S. PATENT DOCUMENTS

| | | | |
|---|---|---|---|
| 2,132,465 | 10/1938 | Gast | 56/255 |
| 2,556,790 | 6/1951 | Berdan | 56/2 |
| 2,719,397 | 10/1955 | Pritchard | 56/17.1 |
| 2,739,437 | 3/1956 | True | 172/15 |
| 2,778,233 | 1/1957 | Perry | 56/16.9 X |
| 2,787,107 | 4/1957 | Strasel | 56/16.9 |
| 2,795,916 | 6/1957 | Miller | 56/17.1 |
| 2,877,617 | 3/1959 | Horner, Jr. | 56/16.9 X |
| 2,909,021 | 10/1959 | McLane | 56/16.9 |
| 2,917,890 | 12/1959 | Thomas | 56/13.7 |
| 2,930,176 | 3/1960 | Lindell | 56/16.9 |
| 2,934,875 | 5/1960 | Katzfey | 56/17.2 |
| 2,938,323 | 5/1960 | Livingston et al. | 56/17.2 X |
| 3,193,996 | 7/1965 | Wellborn | 56/16.9 |
| 3,221,481 | 12/1965 | Mattson et al. | 56/16.9 |
| 3,319,365 | 5/1967 | Perry et al. | 172/15 X |
| 3,350,864 | 11/1967 | Sheps et al. | 56/16.9 |
| 4,103,441 | 8/1978 | Flippin | 37/86 |
| 4,278,133 | 7/1981 | de Marcellus | 172/42 X |
| 4,300,336 | 11/1981 | Miyata | 56/295 |
| 4,835,950 | 6/1989 | Cerreta | 56/12.8 |
| 4,962,631 | 10/1990 | Braun et al. | 56/17.2 |

OTHER PUBLICATIONS

John Deere Outdoor Power Equipment Sales Brochure (exact date of publication uncertain).

Primary Examiner—Dennis L. Taylor
Assistant Examiner—Jeffrey L. Thompson
Attorney, Agent, or Firm—Dykema Gossett

[57] ABSTRACT

An apparatus for trimming weeds and grass employs a prime mover to power a rotating cutting head. Three wheels are used to support the weight of the trimmer, and the prime mover is uniquely mounted to the trimmer such that lowering the cutting head is easily accomplished by tipping the trimmer. Cutting height is adjusted by way of an adjustable height arm, and a secondary handle is provided to receive and translate an upward urging force into a tipping motion. The cutting head can be easily removed and a brush, snow blade or blower can be installed thereto for accommodating a plurality of lawn care tasks.

20 Claims, 2 Drawing Sheets

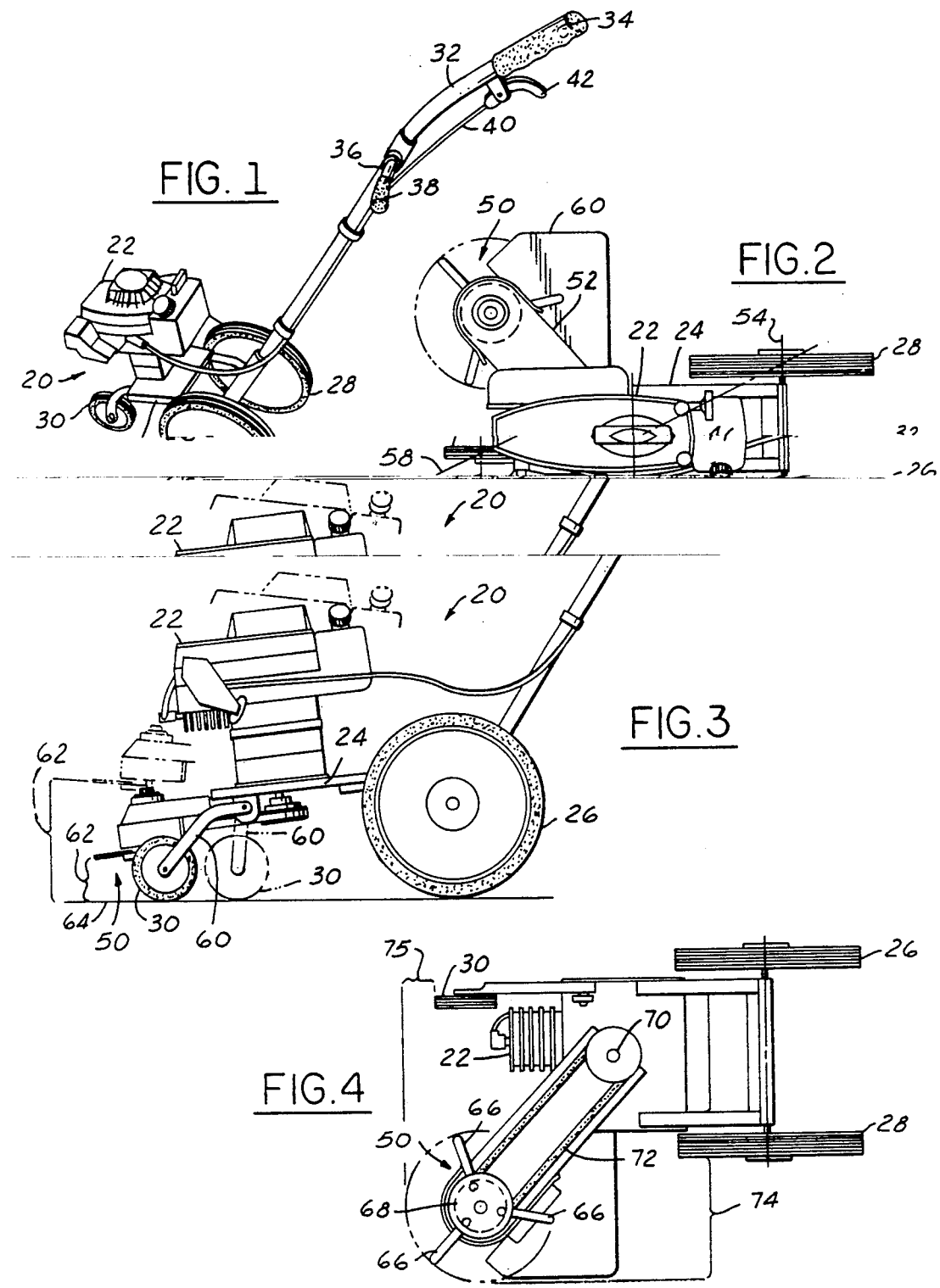

WEED AND GRASS TRIMMER

TECHNICAL FIELD

The present invention relates generally to weed and grass trimmers and more specifically relates to weed and grass trimmers which are mounted on wheels and powered by a prime mover.

BACKGROUND OF THE INVENTION

Developments in small-engine design and technology have allowed them to be used on equipment which heretofore was impractical. Specifically, very powerful two-cycle engines are in use on many lawn care products including weed and grass trimmers. The majority of the weed and grass trimmers are of the type which are totally supported by the user and usually incorporate a shoulder strap or sling which allow the weight of the trimmer to be borne by the user and a handle which allows the user to direct the trimmer's cutting head. User-supported trimmers of this type can be fitted with either an electric or gasoline-operated motor.

Although the user-supported weed and grass trimmers of the type previously discussed have become very popular and can be found in wide use, they are not without their problems. For example, because the weight of the units must be carried by the user, they become burdensome to operate over long periods of time. Additionally, the elderly and those of reduced stamina do not have the physical energy to support and operate the units.

In addition to the above-mentioned drawbacks, user-supported trimmers also suffer from the inability to maintain a constant cutting height. Because the user controls the height of the cutting head by lifting or pushing on the control handle, it is extremely difficult to maintain any measurable consistency of cutting height, and consequently grass which has been trimmed by these units is left with an unattractive appearance. Another problem which is commonly encountered with user-supported trimmers is the dangerous location of the engine. Typically, the engine and the cutting head are mounted at opposite ends of the trimmer's elongated body, thereby placing the engine close to the user when the device is being operated. Heat, exhaust and shock hazards are all present to the detriment of the user when operating the trimmer.

The present invention is directed to overcome the problems associated with the prior art discussed above and provides a significantly improved weed and grass trimmer.

It is therefore a principal object of this invention to provide a weed and grass trimmer which totally supports its weight during operation.

Another object of the present invention is to provide a weed and grass trimmer which maintains a constant cutting height.

Still another object of the present invention is to provide a weed and grass trimmer which allows its cutting head to gain access into tight corners.

Still yet another object of the present invention is to provide a weed and grass trimmer which allows itself to be easily tipped about an axis which lowers the trimmer head towards the ground.

Still yet another object of the present invention is to provide a week and grass trimmer which can be easily fitted with a brush for sweeping sidewalks, a rotary blade for snow removal and a blower attachment for leaf removal.

Still another object of the present invention is to provide a weed and grass trimmer which is easy and safe to operate by people of all ages and skill levels, versatile and inexpensive to purchase and maintain.

SUMMARY OF THE INVENTION

In light of the foregoing objects, the present invention provides a self-supporting grass and weed trimmer comprising a frame member having a horizontally disposed base portion having a forward and rearward end and an upwardly and rearwardly extending primary handle attached to the base, first and second spaced apart wheels having a common axis of rotation and rotatably carried on the rearward end of the base, a forward wheel rotatably carried on the forward end of the base, the diameter of the forward wheel substantially smaller than the diameter of the spaced apart rear wheels, the forward wheel disposed such that its plane of rotation is substantially coplanar with the plane of rotation of said first rear wheel, a rotary cutter rotatably carried by the base and extending beyond the forward wheel, means for powering the cutter, the powering means positioned upon the base such that the center of the powering means is generally disposed over an axis which passes through the center of the forward wheel and the center of the second rearward wheel, and a secondary handle having a first and second end, the first end attached to the primary handle and the second end extending horizontally away from the first end and perpendicularly toward the plane of rotation of the forward wheel and the first rear wheel, whereby the position of the powering means over the axis defined by the center of the forward wheel and the center of the first rearward wheel allows the weight of the powering means to balance about the axis, whereby an upward force of sufficient urging placed upon the secondary handle causes the base to pivot about the axis, thereby causing the cutter to be lowered closer to the ground surface.

In a preferred embodiment, the base includes a support arm for rotatably carrying the rotary cutter, the arm having first and second ends, the first end connected to the base and the second end extending generally forwardly and horizontally from the base. The forward wheel preferably includes means for adjusting the vertical distance between the forward wheel and the base. The rearward wheels and the forward wheel are preferably non-castering, and the rotary cutter rotates in a plane substantially horizontal. The diameter of each rearward wheels is preferably at least twice as great as the diameter of the forward wheel. Preferably, the rotary cutter includes a plurality of plastic blades, a circular cutting blade having serrations along its circumference or a monofilament strand. In an alternative embodiment the cutting head is replaced by a rotary brush for sweeping sidewalks, a fan blade for blowing snow or a blower attachment for leaf removal.

These, together with other objects and advantages which will become subsequently apparent, reside in the details of construction and operation as more fully hereinafter described and claimed.

BRIEF DESCRIPTION OF THE DRAWINGS

FIG. 1 is a perspective view of the weed and grass trimmer which forms the preferred embodiment of the present invention.

FIG. 2 is a partial top view of the weed and grass trimmer of FIG. 1.

FIG. 3 is a partial left side view of the weed and grass trimmer of FIG. 1.

FIG. 4 is a partial bottom view of the weed and grass trimmer of FIG. 1.

DETAILED DESCRIPTION OF THE PREFERRED EMBODIMENTS

Figure 5:
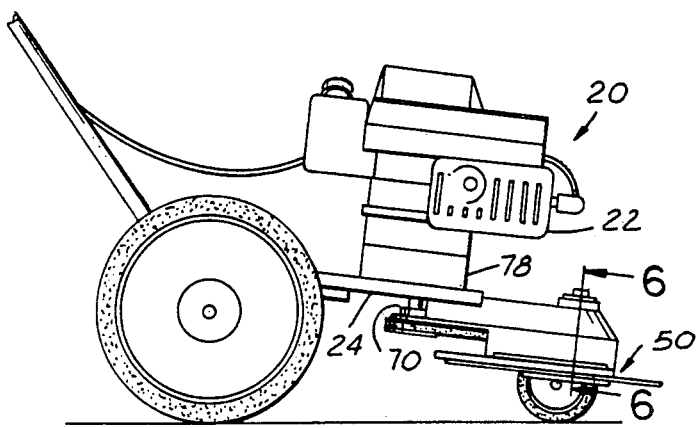
FIG. 5 is a partial right side view of the weed and grass trimmer of FIG. 1.

Referring now to the drawings, FIG. 1 shows the grass and weed trimmer which forms the preferred embodiment of the present invention. Weed and grass trimmer 20 is comprised of a prime mover 22 mounted to a frame member base portion 24. The prime mover 22 is preferably a two-cycle internal combustion engine. A two-cycle engine is preferred because of its simple construction and its lightweight nature. Although the two-cycle engine is the preferred choice, a four-cycle internal combustion engine or an electric motor could be used to furnish the power for the device.

Frame member base portion 24 has two rear wheels 26, 28 and one front wheel 30. As will be discussed in conjunction with FIG. 2, front wheel 30 is offset from the front of the base 24. This offset configuration allows the weed and grass trimmer 20 to function in a unique way. Wheels 28–30 can be of the castering type, but it is preferred that wheels 28–30 are of the non-castering type. This feature allows trimmer 20 to be easily navigated in a straight line and easily tilted.

Frame member base portion 24 includes primary handle 32 which extends upwardly and rearwardly from frame member base portion 24. Primary handle 32 is the primary means of maneuvering weed and grass trimmer 20 and is fitted with primary handle grip 34 to provide a comfortable means of pushing and pulling weed and grass trimmer 20.

Attached to primary handle 32 is secondary handle 36. Secondary handle 36 has first and second ends, the first end of the secondary handle 36 is attached to primary handle 32 and the second end of secondary handle 36 extends generally horizontally away from the first end of secondary handle 36. Secondary handle 36 provides two functions: first, it allows the operator (not shown) to use both hands when operating weed and grass trimmer 20; and second, it allows an operator to easily tip weed and grass trimmer 20 about a select axis which will be fully explained in conjunction with FIG. 9. Secondary handle 36 is fitted with a handle grip 38 for purposes of maneuvering weed and grass trimmer 20 and comfort. Throttle control cable 40 is attached at one end to prime mover 22 and at its other end to throttle control lever 42. By positioning throttle control lever 42 in close proximity to primary handle 32, the user can easily maneuver weed and grass trimmer 20 and control the operating speed of prime mover 22 with one hand.

Now referring to FIG. 2, prime mover 22 is shown having an approximate center of mass located at point 44. Axis 46 runs horizontally through prime mover 22, and axis 48 runs vertically through prime mover 22. With respect to axis 46, prime mover 22 sits generally between the two rear wheels 26, 28. By positioning prime mover 22 such that its horizontal axis 46 is located generally between rear wheels 26, 28, the weight of prime mover 22 is borne equally between rear wheels 26, 28.

Front wheel 30 is offset to the side of frame member base portion 24 and rotates in a plane which is substantially common to the plane of rotation of rear wheel 26. By aligning the plane of rotation of front wheel 30 and rear wheel 26, sufficient offset is provided for power to rotary cutter 50. Rotary cutter 50 is attached to frame member base portion 24 by support arm 52. Rotary cutter 50 is positioned so that it extends angularly from frame member base portion 24. This extension allows it to reach into tight corners unencumbered by front wheel 30 or rear wheel 28.

Rear wheel 28 has as its axis of rotation axis 54. Front wheel 30 has as its axis of rotation axis 56. Axis 58 intercepts the center of front wheel 30 at its axis 56 and the center of rear wheel 28 at its axis 54. It is important to note that axis 58 forms an important point of reference of the disclosed invention. Whenever a user places a force of sufficient upward urging on secondary handle 38 (not shown), this upward force is transmitted to rear wheel 26 along primary handle 32. This upward force causes rear wheel 26 to raise off of the ground and causes weed and grass trimmer 20 to pivot about axis 58. When weed and grass trimmer 20 pivots about axis 58, rotary cutter 50 is lowered to the ground. This lowering of rotary cutter 50 allows the user to quickly lower the rotary cutter 50 to a desired cutting height. When the user completes the desired trimming, he simply removes the upward urging force on secondary handle 36, and weed and grass trimmer 20 will return to its three-point mount (front wheel 30 and rear wheels 26, 28).

The ease upon which rotary cutter 50 can be lowered by way upward urging on secondary handle 38 is due in part upon the equal balancing of all of the component parts of weed and grass trimmer 20 about axis 58. For example, if prime mover 22 is located directly between rear wheels 26, 28, it would be much harder to pivot weed and grass trimmer 20 about axis 58. This is primarily because the center of mass 44 of prime mover 22 is displaced far away from axis 58. It is important to note that because the prime mover 22 of the present invention is placed generally above axis 58, its weight about axis 58 cancels and is thereby not felt by the operator when an upward urging force is placed on secondary handle 38. It is not absolutely imperative that center of mass 44 of prime mover 22 be directly above axis 58, and some latitude is permissible, the important factor being the greater the deviation of center of mass 44 from axis 58, the more difficult it becomes for the operator to pivot weed and grass trimmer 20 about axis 58.

Shield 60 is provided to prevent any flying debris, which is kicked up by rotary cutter 50, from injuring the operator.

Now referring to FIG. 3 of the drawings, rear wheels 26, 28 (rear wheel 28 not visible in this view) are preferably non-pneumatic and should have a diameter sufficiently large to enable weed and grass trimmer 20 to be easily maneuvered through rough and uneven terrain. In contrast, front wheel 30 should be significantly smaller in diameter and preferably at least twice as small in diameter as rear wheels 26, 28. By making front wheel 30 small, it minimizes its obtrusiveness and weight and allows the weed and grass trimmer 20 to be constructed more compactly. Additionally, by making front wheel 50 non-castering, weed and grass trimmer 20 will have less of a tendency to roll when an upward force is applied to secondary handle 36.

Front wheel 30 is attached to frame member base portion 24 by adjustable height arm 60. Adjustable height arm 60 allows front wheel 30 to assume a plurality of different positions, each position affecting the height 62 of rotary cutter 50 with respect to the ground line 64. Once front wheel 30 is set in the desired position, rotary cutter 50 will maintain a constant cutting height without any additional attention by the user. In contrast, with hand-held weed and grass trimmers, the user is responsible for maintaining the orientation and height of the rotary cutter in order to assure a constant cutting height. Even if a user of a hand-held weed and grass trimmer can maintain some grass height consistency, it becomes more difficult as the user's arms grow tired supporting and swinging the hand-held unit. The weed and grass trimmer of the present invention does not have these same drawbacks because the user is not responsible for supporting the weight of the trimmer 20 or maintaining rotary cutter height 62 above ground line 64.

Prime mover 22 can be constructed from a gasoline-powered engine or an electric motor without affecting the scope of the present invention. The only consideration must be that the prime mover is capable of operating at a plurality of different orientations which are achievable by the different settings of front wheel 30. An important feature of the present invention is the relative placement of rotary cutter 50 which allows it to extend beyond any other portion of weed and grass trimmer 20. This feature enables weed and grass trimmer 20 to reach and cut weeds and grass which grow adjacent to any vertical structure.

Now referring to FIG. 4, rotary cutter 50 is constructed from a plurality of cutting elements 66 mounted to a rotating head 68. Rotary cutter 50 is powered by output shaft 70 of prime mover 22. Coupling means 72 is provided between output shaft 70 and rotating head 68. Coupling means 72 is shown as a continuous belt in FIG. 4, but chain, drive shaft or direct-drive means could also be incorporated to transfer power from prime mover 22 to rotating head 68. Clearly depicted in FIG. 4 is the extent to which cutting elements 66 extend beyond rear wheel 28. This extension is illustrated by reference numeral 74. Because extension 74 exists in the preferred embodiment of the present invention, rear wheel 28 does not potentially interfere with the ability of trimmer 20 to cut weeds and grass which grow in close proximity to trees, bushes, edging structures, homes and the like. Extension 75 depicts the forward position of rotating head 68 beyond front wheel 30. This forward projection of head 68 allows the trimmer 20 to reach weeds and grass unimpeded by front wheel 30.

Now referring to the drawings of FIG. 5, weed and grass trimmer 20 has a prime mover 22 which is mounted to frame member base portion 24. Prime mover 22 is fitted with a centrifugal clutch 78 which allows the interruption of power along output shaft 70 during low rpm conditions. Once the throttle control lever 42 (not shown) is activated, prime mover 22 increases in rpm. Once a predetermined rpm threshold is exceeded, clutch 78 engages output shaft 70 to prime over 22, thereby transferring energy from prime mover 22 to rotary cutter 50.

Figure 6:
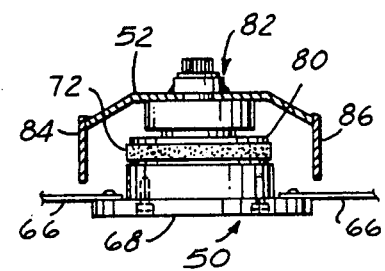
FIG. 6 is a partial vertical sectional view taken substantially along line 6—6 of FIG. 5.

Now referring to the drawing of FIG. 6, rotary cutter 50 is comprised of a rotating head 68 and a plurality of cutting elements 66. Pulley 80 transfers the energy from coupling means 72 to rotating head 68. Rotating head 68 is rotatably mounted to support arm 52 by way of bearing means 82. Support arm 52 is fitted with protective side rails 84, 86. These protective side rails 84, 86 prevent flying debris from interfering with the cooperation between coupling means 72 and pulley 80.

Figure 7:
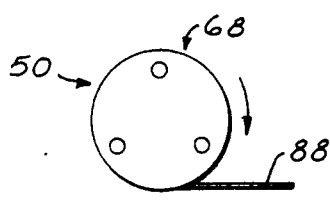
FIG. 7 is an alternative embodiment of the cutter employed by the present invention.
Figure 8:
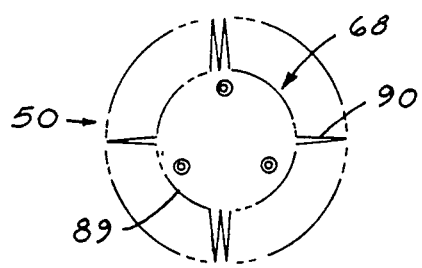
FIG. 8 is an alternative embodiment of the cutter employed by the present invention.

Now referring to FIGS. 7 and 8, rotary cutter 50 can be fitted with a plurality of cutting elements 66 such as those depicted in FIGS. 4 and 6. Alternatively, rotating head 68 can have, as its cutting means, a monofilament strand 88. Monofilament strand 88 can be wrapped around a spool embedded in rotating head 68 and can be unwound from the spool, manually or automatically, as needed. Rotating head 68 can also be fitted with a circular blade 89 having serrations 90 along its circumference. Circular blade 89 could be constructed from a plurality of materials such as rubber, plastic, Nylon TM, and the like. Circular blade 89 could potentially be constructed from metal, thereby allowing weed and grass trimmer 20 to be used for clearing small shrubbery, brush, small trees and the like.

Figure 10:
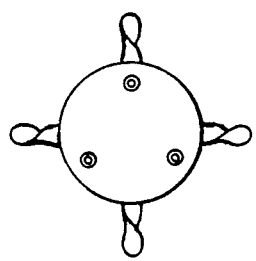
FIG. 10 is a bottom view of a leaf and snow blower attachment for use with the present invention.
Figure 11:
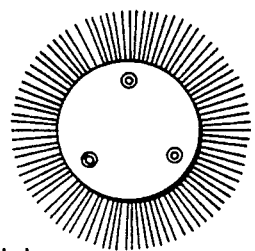
FIG. 11 is a bottom view of a brush attachment for use with the present invention.

In place of the rotary cutter 50, other rotating accessories could be used to accommodate a number of lawn care tasks. For example, a standard brush element (see FIG. 11) could be fastened to rotary head 68, thereby providing a rotary brush for cleaning sidewalks. Likewise, a standard blower (see FIG. 10) could be fixed to rotating head 68 for blowing leaves and other debris. Additionally, a rotary blade (see FIG. 10) could be fastened to rotating head 68 to provide a snow blowing function. The necessary accessories needed to accomplish sidewalk cleaning, and leaf and snow blowing are well known to those skilled in the art.

Figure 9:
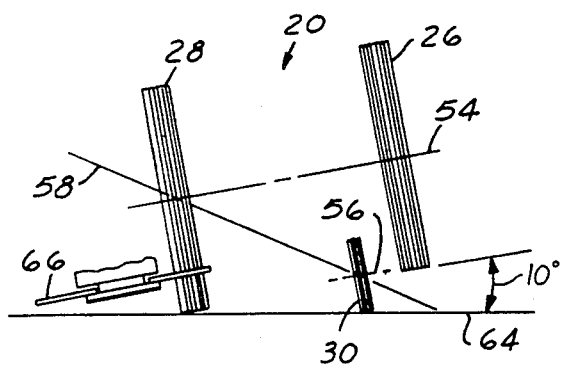
FIG. 9 is a partial front view of the wheels and cutter of the present invention.

Now referring to FIG. 9 of the drawings, rear wheels 26, 28 share a common axis of rotation 54. Front wheel 30 has an axis of rotation 56. Front wheel 30 has a plane of rotation which is substantially coplanar to the plane of rotation of rear wheel 26. As was described in conjunction with FIG. 2, prime mover 22 (not shown) has a center of mass 44 which is substantially mounted directly over axis 58. Axis 58 intercepts the two points defined by the center of rear wheel 28 and the center of front wheel 30. Because the center of mass 44 of prime mover 22 resides predominantly above axis 58, the majority of the weight of weed and grass trimmer 20 is balanced about axis 58. Consequently, when an urging force is placed upwardly on secondary handle 36, weed and grass trimmer 20 will tip about axis 58 as depicted in FIG. 9. Because the center of mass 44 of prime mover 22 is mounted above axis 58, the user is not burdened with the entire weight of prime mover 22 when this tipping motion is desired. By tipping weed and grass trimmer 20, cutting elements 66 are lowered closer to the ground line 64, and accordingly can trim weed and grass closer to their base. The ability to tip weed and grass trimmer 20 in this manner is a unique feature of the invention because it allows a user to achieve a wide range of cutting heights without necessitating any type of adjustment.

From this view, it is easy to see that if front wheel 30 were of the castering type, weed and grass trimmer 20 would roll along the ground whenever the user places an upwards force on secondary handle 36 (not shown). When front wheel 30 is non-castering, weed and grass trimmer 20 resists any tendency to roll in a direction other than perpendicular to the axes 54 and 56, thereby making the trimmer easier to tip about axis 58.

The foregoing detailed description shows that the preferred embodiments of the invention are well-suited to fulfill the objects stated. It is recognized that those skilled in the art may make various modifications or additions to the preferred embodiments chosen here to illustrate the present invention, without departing from the spirit of the present invention. For example, cutting elements 66 can take on any number of embodiments as heretofore described. It is also contemplated that various accessories could be added to the weed and grass trimmer, such as lights, electric starter options, self-propelled options and the like without departing from the scope or spirit of the present invention. Accordingly, it is to be understood that the protection sought to be afforded hereby should be deemed to extend to the subject matter defined in the appended claims including all fair equivalents thereof.

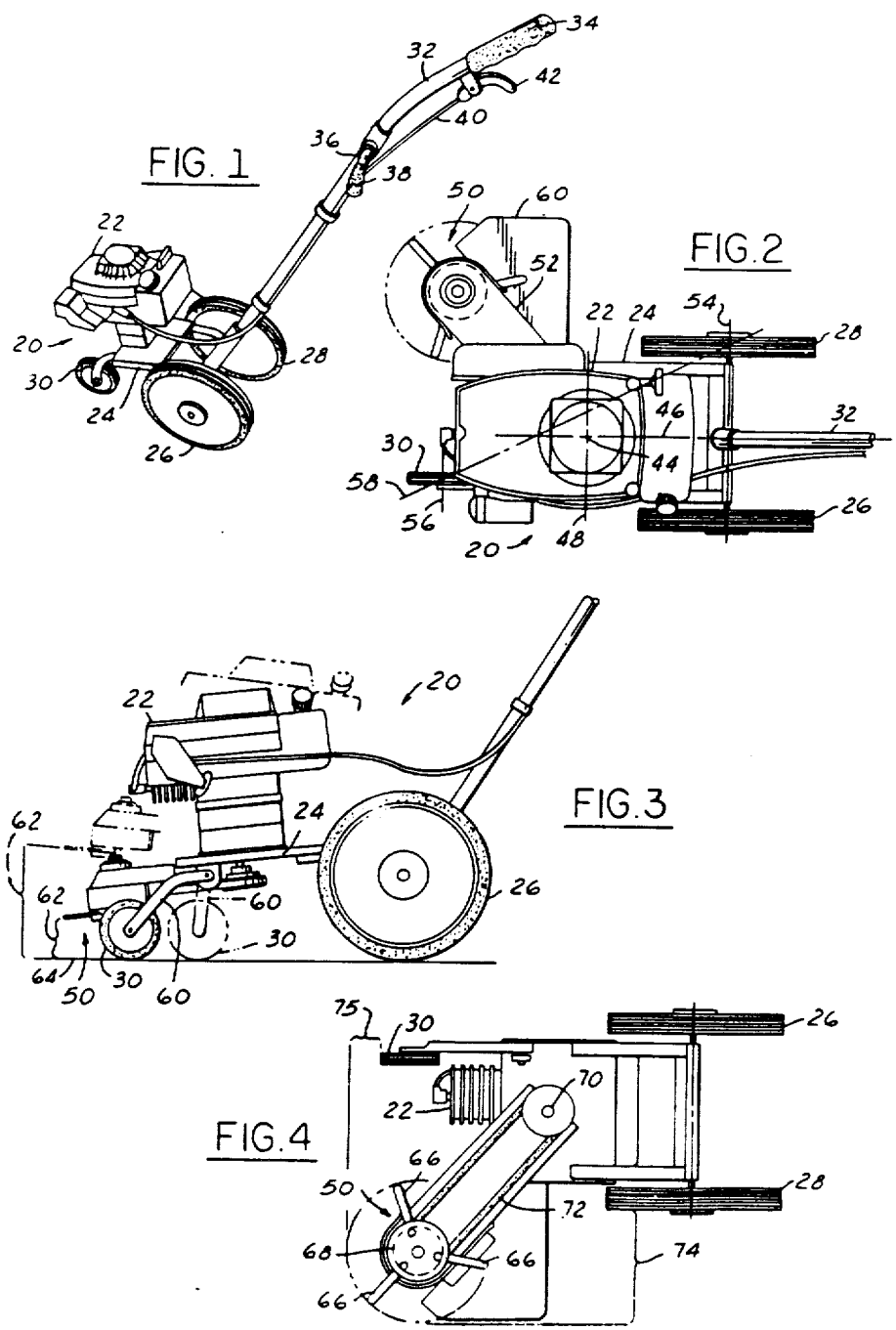

I claim:

1. A self-supporting grass and weed trimmer, and comprising:
    a frame member having a horizontally disposed base portion having forward and rearward ends and an upwardly and rearwardly extending primary handle attached to said base;
    first and second spaced apart wheels having a common axis of rotation and rotatably carried on said rearward end of said base;
    a forward wheel rotatably carried on said forward end of said base, the diameter of said forward wheel substantially smaller than the diameter of said spaced apart wheels, and said forward wheel disposed such that its plane of rotation is substantially coplanar with the plane of rotation of said first rear wheel;
    a rotary cutter rotatably carried by said base and extending forwardly beyond said forward wheel;
    means for powering said cutter, said powering means positioned upon said base such that the center of gravity of said powering means is generally disposed over a second axis which passes through the center of said forward wheel and the center of said second rearward wheel; and
    means for pivoting said base about said second axis, said pivoting means having a first and second end, said first end attached to said primary handle and said second end extending horizontally away from said first end and perpendicularly toward the plane of rotation of said forward and first rear wheel;
    whereby the position of said powering means over said second axis defined by said center of said forward wheel and said center of said second rearward wheel allows the weight of said powering means to be substantially balanced about said second axis, whereby an upward force of sufficient urging placed on said pivoting means causes said base to pivot about said second axis thereby lowering said cutter closer to the ground.

2. The apparatus of claim 1, wherein said base further includes a support arm for rotatably carrying said rotary cutter, said arm having first and second ends, said first end connected to said base and said second end extending generally forwardly and horizontally from said base.

3. The apparatus of claim 1, wherein said forward wheel further includes means for adjusting the vertical distance between said forward wheel and said base.

4. The apparatus of claim 3, wherein said rearward wheels and said forward wheel are non-castering.

5. The apparatus of claim 4, wherein the diameter of said first and second rearward wheels is at least twice as great as the diameter of said forward wheel.

6. The apparatus of claim 1, wherein said rotary cutter rotates in a plane substantially horizontal.

7. The apparatus of claim 6, wherein said rotary cutter includes a plurality of plastic blades.

8. The apparatus of claim 6, wherein said rotary cutter includes a circular blade having serrations along its circumference.

9. The apparatus of claim 6, wherein said rotary cutter includes a monofilament strand.

10. A self-supporting rotary implement, comprising:
    a frame member having a horizontally disposed base portion having forward and rearward ends and an upwardly and rearwardly extending primary handle attached to said base;
    first and second spaced apart wheels having a common axis of rotation and rotatably carried on said rearward end of said base;
    a forward wheel rotatably carried on said forward end of said base, the diameter of said forward wheel being substantially smaller than the diameter of said spaced apart wheels, and said forward wheel disposed such that its plane of rotation is substantially coplanar with the plane of rotation of said first rear wheel;
    rotary means rotatably carried by said base and extending forwardly beyond said forward wheel;
    means for powering said rotary means, said powering means positioned upon said base such that the center of gravity of said powering means is generally disposed over a second axis which passes through the center of said forward wheel and the center of said second rearward wheel; and
    means for pivoting said base about said second axis, said pivoting means having a first and second end, said first end attached to said primary handle and said second end extending horizontally away from said first end and perpendicularly toward the plane of rotation of said forward and first rear wheel;
    whereby the position off said powering means over said second axis defined by said center of said forward wheel and said center of said second rearward wheel allows the weight of said powering means to be substantially balanced about said second axis, whereby an upward force of sufficient urging placed on said pivoting means causes said base to pivot about said second axis and thereby causing said rotary means to be lowered closer to the ground.

11. The apparatus of claim 10, wherein said base further includes a support arm for rotatably carrying said rotary means, said arm having first and second ends, said first end connected to said base and said second end extending generally forwardly and horizontally from said base.

12. The apparatus of claim 10, wherein said forward wheel further includes means for adjusting the vertical distance between said forward wheel and said base.

13. The apparatus of claim 12, wherein said rearward wheels and said forward wheel are non-castering.

14. The apparatus of claim 13, wherein the diameter of said first and second rearward wheels is at least twice as great as the diameter of said forward wheel.

15. The apparatus of claim 10, wherein said rotary cutter rotates in a plane substantially horizontal.

16. The apparatus of claim 15, wherein said rotary means includes a brush for sweeping sidewalks.

17. The apparatus of claim 15, wherein said rotary means includes a fan type rotary blade for snow removal.

18. The apparatus of claim 15, wherein said rotating means includes a blower for leaf removal.

19. A method of designing and using a three-wheeled rotary implement which is easily tipped, said implement of the type having a base which supports a prime mover and an upwardly and rearwardly extending operator's handle, said base supported off of the ground by a front wheel and a first and second rear wheel, said front wheel and said first rear wheel having substantially a common plane of rotation and said first and second rear wheels having a common axis of rotation, comprising the steps of:
    mounting said prime mover on said base substantially in line between said front wheel and said second rear wheel, whereby the weight of said prime mover is substantially balanced about an axis extending between said front wheel and said second rear wheel, and
    tipping said base about said axis by placing a force of sufficient urging on said operator's handle.

20. A self-supporting grass and weed trimmer, comprising:
    a frame member having a horizontally disposed base portion having forward and rearward ends and an upwardly and rearwardly extending primary handle attached to said base;
    first and second spaced apart wheels having a common axis of rotation and rotatably carried on said rearward end of said base;
    a forward wheel rotatably carried on said forward end of said base, the diameter of said forward wheel substantially smaller than the diameter of said spaced apart wheels, and said forward wheel disposed such that its plane of rotation is substantially coplanar with the plane of rotation of said first rear wheel;
    a rotary cutter rotatably carried by said base and extending forwardly beyond said forward wheel;
    means for powering said cutter, said powering means positioned upon said base such that the center of gravity of said powering means is generally disposed over a second axis which passes through the center of said forward wheel and the center of said second rearward wheel; and
    means for pivoting said base about said second axis, said pivoting means having a first and second end, said first end attached to said primary handle and said second end extending horizontally away from said first end and perpendicularly toward the plane of rotation of said forward and first rear wheel;
    whereby the position of said powering means over said second axis defined by said center of said forward wheel and said center of said second rearward wheel allows the weight of said powering means to be substantially balanced about said second axis, whereby an upward force of sufficient urging placed on said pivoting means causes said base to pivot about said second axis and thereby causing said cutter to be lowered closer to the ground and wherein said base further includes,
    a support arm for rotatably carrying said rotary cutter, said arm having first and second ends, said first end connected to said base and said second end extending generally forwardly and horizontally from said base, and wherein said forward wheel further includes,
    means for adjusting the vertical distance between said forward wheel and said base, and wherein said rearward wheels and said forward wheel are non-castering and wherein said rotary cutter rotates in a plane substantially horizontal.

* * * * *

UNITED STATES PATENT AND TRADEMARK OFFICE
CERTIFICATE OF CORRECTION

PATENT NO. : 5,048,615

DATED : September 17, 1991

INVENTOR(S) : Marvin H. Feldmann

It is certified that error appears in the above-identified patent and that said Letters Patent is hereby corrected as shown below:

The Drawing Sheet 1 of 2 should be deleted and substitute therefor the attached Drawing Sheet 1 of 2.

Signed and Sealed this

Second Day of February, 1993

Attest:

STEPHEN G. KUNIN

Attesting Officer

Acting Commissioner of Patents and Trademarks